Patented Jan. 8, 1935

1,987,559

UNITED STATES PATENT OFFICE 1,987,559

PROCESS OF PRODUCING BORON TRICARBOXYLATES

Anton Hintermaier, Dusseldorf, Germany, assignor to the firm Henkel & Cie. Gesellschaft mit beschränkter Haftung, Dusseldorf, Germany No Drawing. Application December 10, 1932, Serial No. 646,710. In Germany December 23, 1931

6 Claims. (Cl. 260—112)

Boron tricarboxylates are already known. Hitherto these compounds were obtained by causing boric anhydride to act upon acetic anhydride or by causing acid-chlorides to act upon boric acid and causing organic acids to react with boric acetic anhydride. Thus, in order to produce the said compounds, a plurality of different reaction stages has heretofore been necessary.

It has now been found, that compounds of boric acid or boron oxide and of other carboxylic acids other than acetic acid may be obtained in a simple manner and in a single stage of operation by allowing dehydrating substances, such as for instance anhydrides or acid-chlorides, to act upon mixtures of carboxylic acids and boric acids, preferably at raised temperature. It is for instance possible to obtain boron tristearate of the formula

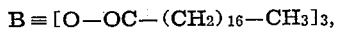

by heating equivalent amounts of boric acid and stearic acid together with somewhat more than the calculated amount of acetic anhydride at water bath temperature and distilling off the glacial acetic acid formed and the surplus of acetic anhydride after the reaction has been completed.

Boron tristearate may also be obtained by causing other dehydrating substances, such as for instance thionyl chloride or phosphorus trichloride or phosphorus pentachloride, to act upon a mixture of equivalent quantities of stearic acid and boric acid. The reactions will in this case take place after the following equations.

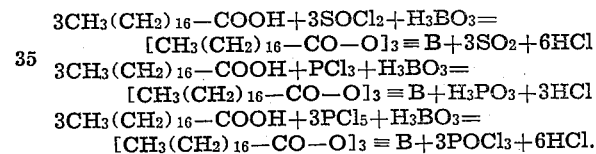

The hitherto known working processes consist of a plurality of reaction stages. In comparison with the older processes the process of the present invention presents the advantages that it is performed in a single stage of operation and that a very good yield of boron tricarboxylates is obtained. This also involves considerable savings in costs, time, material and reaction vessels.

Example 1

284 parts by weight of stearic acid are heated together with 21 parts by weight of boric acid and 200 parts by weight of acetic anhydride on the water bath until a homogeneous clear solution has been formed. The acetic acid obtained and the surplus of acetic anhydride are thereupon distilled off in vacuum. The theoretically calculated yield is obtained and the product formed is (eventually after recrystallization) a pure boron tristearate having a melting point of 71° C.

The quantitatively formed concentrated acetic acid may after the usual method again be converted into anhydride or may be utilized in other ways.

The acetic acid formed may also be distilled off during the reaction.

Example 2

300 g. of lauric acid and 31 g. of boric acid are heated together with 250 g. of acetic anhydride on a reflux-cooler until the boric acid has been completely dissolved. After a treatment of about 7 hours, the acetic acid formed and the surplus of acetic anhydride are distilled off and finally the temperature is raised to 180° C. at a pressure of 2 mm. mercury. The boron trilaurate has in the cold the form of a slightly colored crystalline substance.

Example 3

204 g. of cocoa oil acids are boiled on a reflux cooler together with 21 g. of boric acid and 200 g. of acetic anhydride. When the reaction has terminated the acetic acid formed and the surplus of acetic anhydride are distilled off in vacuum, whereby hydrogen is passed through the vessel. The product obtained is a compound of the cocoa oil acids and the boric acid, which at normal temperature is liquid and sensitive towards moisture.

Example 4

122 g. of benzoic acid and 21 g. of boric acid are finely pulverized and to this mass 120 g. of acetic anhydride are added. When this mixture has boiled on a reflux-cooler for about 4½ hours, the boric acid will be completely dissolved. The acetic acid formed is distilled off in vacuum together with the surplus of acetic anhydride. After the greater part of the solvent has been removed, the contents of the jar will solidify. The mass is thereupon still for some time heated to about 180° C. (at a pressure of 2 mm. mercury), whereby some benzoic acid is distilled off. The obtained boron tribenzoate has a melting point of 166° C.

Example 5

50 g. of cinnamic acid and 7 g. of boric acid are pulverized together and in the cold 40 g. of thionyl chloride are added. A surplus of thionyl chloride should be avoided. When the formation of gas has ceased at 90° C. the heating is continued up to 180° C. for 2 hours, whereby hydrochloric acid is formed. When the formation of hydrochloric acid has ceased, the clear melted reaction product is allowed to cool. This product is very sensitive towards moisture. The melting point of the boron tricinnamate depends on the rate of heating and usually lies at about 125–130° C.

*Example 6*

100 parts by weight of stearic acid are heated together with 4,1 parts by weight of finely pulverized boron trioxide and 100 parts by weight of acetic anhydride on a reflux-cooler. When the boron trioxide has been completely dissolved the acetic acid formed and the surplus of acetic anhydride are distilled off in vacuum. The residue is boron tristearate. This product, which has the same melting point as the product described in Example 1, forms a clear solution, when dissolved in benzol, acetone or hot alcohol.

Compared with the known process of producing boron tristearate from boron trioxide and acetic anhydride, which process comprises a subsequent conversion with the organic acid, the process described in the last example represents a vast improvement in that it involves a simplified working process and gives substantially the theoretically calculated yield. When working in the known manner, the yields are very much lower, because the boric acetic anhydride is extremely sensitive towards moisture.

The boron tricarboxylates obtained in accordance with the present invention may be used as starting substances for the producing of other valuable compounds. The said products may for instance easily be converted into the corresponding alcohols by adding hydrogen catalytically.

I claim:—

1. A process of producing boron tricarboxylates, comprising subjecting a mixture of a carboxylic acid having more than 6 carbon atoms in the molecule and of an inorganic boron compound containing oxygen but no metal to the action of acetic acid anhydride.

2. A process of producing boron tricarboxylates, comprising subjecting a mixture of a carboxylic acid having more than 6 carbon atoms in the molecule and of an inorganic boron compound containing oxygen but no metal to the action of acetic acid anhydride at raised temperature.

3. A process of producing boron tricarboxylates, comprising treating a mixture of a carboxylic acid having more than 6 carbon atoms in the molecule and of boric acid with acetic acid anhydride.

4. A process of producing boron tricarboxylates, comprising subjecting a mixture of a carboxylic acid having more than six carbon atoms in the molecule and of boric acid to the action of acetic acid anhydride at raised temperature.

5. A process of producing boron tricarboxylates, comprising subjecting a mixture of a carboxylic acid having more than 6 carbon atoms in the molecule and of an inorganic boron compound containing oxygen but no metal to the action of lower fatty acid anhydride.

6. A process of producing boron tricarboxylates, comprising subjecting a mixture of a carboxylic acid having more than 6 carbon atoms in the molecule and of an inorganic boron compound containing oxygen but no metal to the action of lower fatty acid anhydride at raised temperature.

ANTON HINTERMAIER.